UNITED STATES PATENT OFFICE.

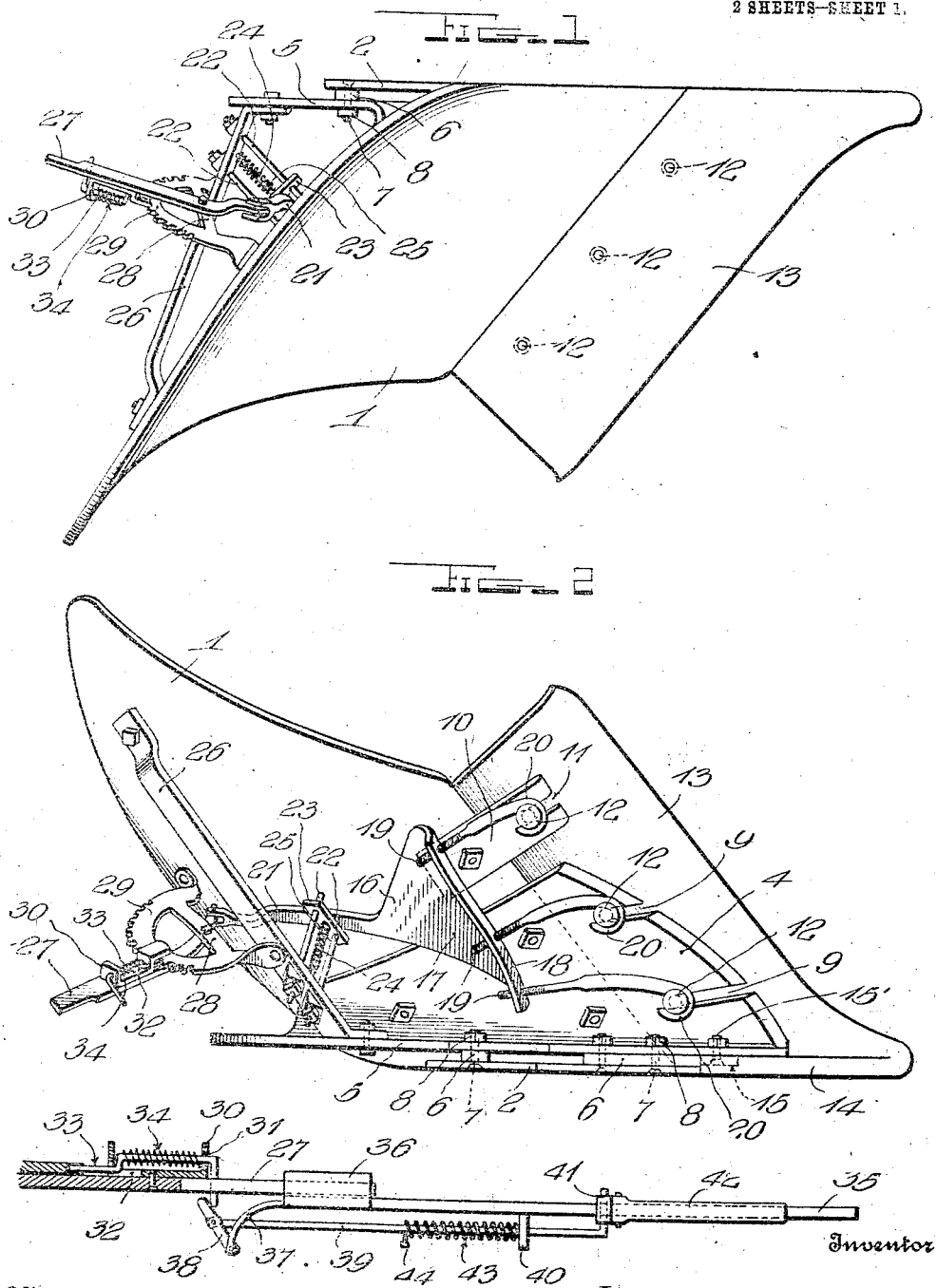

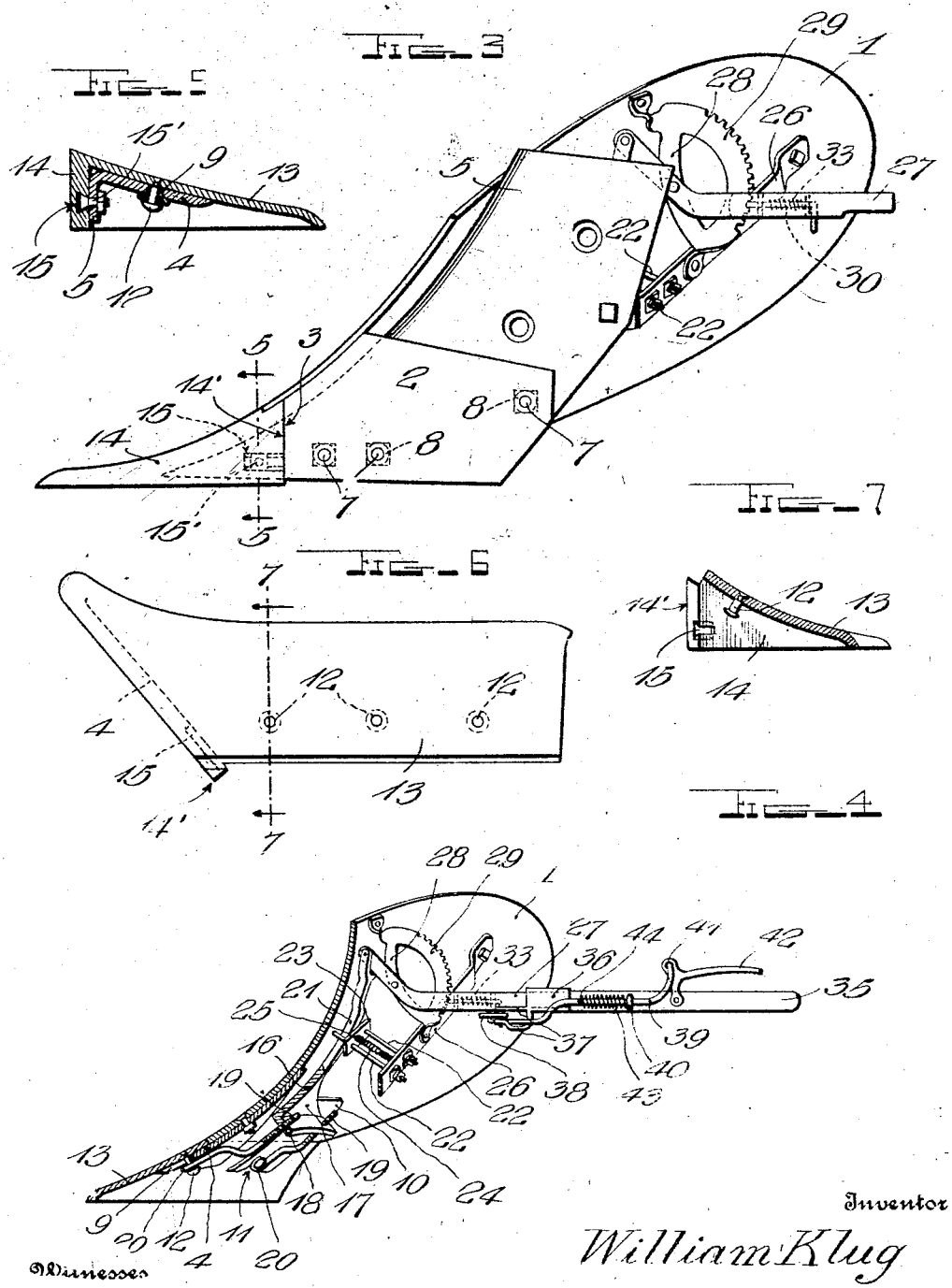

WILLIAM KLUG, OF PLAZA, NORTH DAKOTA.

DETACHABLE SHARE.

1,135,818.  Specification of Letters Patent.  Patented Apr. 13, 1915.

Application filed January 26, 1914. Serial No. 814,379.

*To all whom it may concern:*

Be it known that I, WILLIAM KLUG, a citizen of the United States, residing at Plaza, in the county of Mountrail and State of North Dakota, have invented a new and useful Improvement in Attaching Detachable Shares, of which the following is a specification.

My invention relates to plows but more particularly to that class of the latter having the plow share detachably connected therewith.

One object of my invention is to provide a plow having means to detachably receive and engage a plow share, so that the latter may be readily removed for repairing, sharpening, etc., or replaced by another when worn.

Another object of my invention is to provide a member slidable over the mold board and having means coöperating with other means carried by the share to retain the latter in adjusted position.

A still further object of my invention is to provide a novel and unique means for the actuation of said member.

A still further object of my invention is to provide a supplemental plate for the mold board having means providing for the positive engagement of certain other means carried by the plow share whereby the latter may be detachably engaged with said mold board.

With these and other objects in view, the invention consists of certain novel features of construction, combination and arrangement of parts as will be more fully described and claimed.

In the accompanying drawings in which corresponding numbers are designated by similar reference characters: Figure 1 is a top plan view of my improved plow; Fig. 2 is a bottom plan view thereof; Fig. 3 is a side elevation; Fig. 4 is a perspective view partly in section illustrating the mold board appurtenances and manner of attaching the plow share; Fig. 5 is a transverse section taken on the line 5—5 of Fig. 3; Fig. 6 is a side elevation of my improved plow share; Fig. 7 is a transverse section thereof taken on the line 7—7; and Fig. 8 is a top plan view of my improved detachable handle showing the latter in engagement with the actuating lever of the finger supporting plate, said lever being shown partly in section.

In its present exemplification my invention comprises a mold board 1 having the configuration shown, a land side 2 suitably supported in angular relation thereto and having one corner cut away so as to conform to one edge of the mold board against which it abuts, while the end contiguous to said cut away portion is straight as at 3 and disposed in offset relation to the lower edge of the mold board so as to form a seat the purpose of which will be hereinafter referred to. Removably connected to the forward portion of the mold board 1 is a frog 4 having integrally formed therewith a frog landside 5 which carries the land side 2, the latter being spaced therefrom by the spacing blocks 6 and connected thereto by bolts 7 projecting through suitable openings formed in spacers 6 and frog landside 5, said bolts having threaded thereon nuts 8 to prevent their disengagement. The lower edge of the frog 4 projects beyond that of the mold board 1 and is provided with notches 9 as clearly shown in Fig. 2. Disposed contiguous to the inner edge of the frog 4 is a pivotally mounted companion plate 10 also provided with a notch 11. The notches thus formed in the frog 4 and companion plate 10 are intended to receive the headed studs 12 secured in spaced relationship to the inner side of the plow share 13 disposed contiguous to the upper edge of the latter.

The plow share 13 carries a share landside 14 provided with an extension 14' intended to enter the hereinbefore mentioned seat formed by the coöperation of the edge 3 with the land side 2 and one edge of the mold board 1 as clearly shown in Fig. 3 and thus making a neat and compact connection between the mold board and plow share. In addition to the above the landside 14 is also provided on its under side with a groove 15 extending inwardly from one edge of the wing and adapted to receive the head of the bolt 15' disposed contiguous to the lower end of the frog 4 as clearly shown in Figs. 3 and 5. This arrangement forms a guide for the plow share when the latter is being placed in position and also adds to the stability of its connection with the mold board 1. In this connection it is to be noted that by extending the supplemental frog 4 so that the latter underlies the plow share 13 I am enabled to greatly reinforce the latter so that it will not be as readily distorted as would be the shares employed in connection with the ordinary plow.

To engage and firmly secure the headed studs 12 after the latter have been engaged with the notches in the frog 4 and the companion plate 10 there is provided a plate which I will, for the sake of convenience, designate as a finger supporting plate 16. This latter is transversely disposed across the mold board and has one end enlarged as at 17 and the lower edge of this enlarged portion extended outwardly at right angles as at 18 and provided with a series of threaded openings which receive the threaded ends of the fingers 19. The free ends of these fingers are hooked shaped as at 20 so as to engage the studs 12 on the plow share as clearly shown in Fig. 2. The major portion of the finger supporting plate is reduced as at 21 and passes between guides 22 which latter are arranged in parallel relationship on the mold board 1, said reduced portion being yieldingly held against vertical movement by the plate 23 slidably mounted on the guides 22, and yieldingly held in engagement with the reduced portion of the finger supporting plate 16 by the spring 24 interposed between the guides 22 with one end inclosing the stud 25 formed on the plate 23 and the opposite end inclosing a small stud formed on a bracing bar 26 to be hereinafter referred to.

For the actuation of the finger supporting plate 16 the free end of the latter is pivotally connected to a lever 27 which in turn is pivoted intermediate its ends to the bar 28, whose extremities are secured to or integral with the segmental rack 29. Rack 29 is mounted in a plane substantially at right angles to that of the mold board 1 and has one of its extremities secured to the latter and the other suitably connected to the hereinbefore mentioned bracing bar 26, one end of which is bent inwardly substantially at right angles and connected by bolts, or otherwise, to the landside 5 of the frog 4 as clearly shown in Fig. 7. By arranging the finger supporting plate 16 in the manner described it may be actuated transversely across the mold board 1 so that the curved end of the fingers 19 which have been brought into engagement with the studs on the plow share will completely draw said studs within the notches formed in the companion and supplemental plates thus bringing and holding the plow share in contact with the mold board and land side.

In order to lock the lever 27 in its adjusted position, I provide a plate 30 which is secured to the lever 27 contiguous to its free end and has its lower portion offset from said lever and overlying one side of the rack 29, the upper end of this plate 30 extending outwardly at right angles and provided with an opening 31 which coacts with the opening 32 formed in the central portion of said plate 30. Extending through the two openings 31 and 32 is a pawl 33 whose lower end is adapted to engage the teeth of the segmental rack 29 and is offset so as to be disposed immediately above the rack as will be understood without further description. To retract the pawl after the latter has been disengaged there is provided a spring 34 encircling said pawl and having its upper end disposed immediately below the right angularly projecting portion of the plate 30 and its lower end connected to the pawl 33. To permit operation of the pawl, its upper or free end is bent substantially at right angles to its body portion and overlies the toothed edge of the rack.

Detachably connected with the free end of lever 27, as shown in Figs. 4 and 8, is a handle 35 having at its lower end a socket or casing 36 which receives the free end of said lever 27. Projecting obliquely from the lower end of the casing 36 are the two arms 37 to the lower ends of which is connected a dog 38, which, when the handle is in engagement with the free end of lever 27, is adapted to engage the right angularly extending portion of the pawl 33. To actuate the dog 38 the latter is connected to one end of a rod 39 mounted on one side of the handle and in the guide nut 40. The upper end of rod 39 is extended laterally and then forwardly into engagement with the eye 41 formed in the hand grip 42. As it is desired that the dog 38 be brought to its initial position after every actuation of the hand grip, a spring 43 is disposed on the rod 39 with one end underlying the guide nut 40 and the other end engaging the stop screw 44, consequently whenever the dog is brought to an elevated position the spring will be compressed so that releasement of the hand grip will immediately return the dog to its original position. Thus it will be seen that when the studs carried by the plow share have been seated within the notches adapted to receive them, the fingers carried by the finger supporting bar brought into engagement with the studs, the finger bar actuated and locked in actuated position, the plow share will be firmly and detachably connected to the mold board without any disadvantages ensuing from said detachable connection.

From the foregoing it will be seen that I have provided a plow and one in which the plow share may be replaced when desired and repaired when necessary.

Various changes in the form, proportion and the minor details of construction may be resorted to without departing from the principle or sacrificing any of the advantages of the claimed invention.

I claim as my invention:

1. A device of the character described comprising a plow share, a series of laterally projecting studs thereon, a frog and a mold board disposed upon the latter and having therein notches to receive said studs, a finger supporting member movably mounted upon said mold board, fingers carried by said member to engage said studs and means coöperating with said member to actuate the latter and retain the same in adjusted position.

2. A device of the character specified comprising a plow share, a mold board, a frog mounted upon the latter and having therein a plurality of notches, a guide plate disposed contiguous to said frog, said plate having therein a notch, a series of laterally projecting studs carried by said plow share, one of said studs being adapted to project into the notch formed in said guide plate, the remaining studs being adapted to project within the notches formed in said frog, a finger supporting member movably mounted upon said mold board, fingers carried by said member to engage said studs, and means coöperating with said member to actuate the latter and retain the same in adjusted position substantially as and for the purpose set forth.

3. A device of the character described comprising a plow share, a series of studs thereon, a mold board, a land side arranged in divergent relation thereto, a frog interposed between the mold board and landside, said frog having its lower edge notched, to receive said studs, spacers intermediate one side of said frog and said landside, a finger supporting member movably mounted upon said mold board, fingers carried by said member to engage said studs, and means coöperating with said member to actuate the latter and retain the same in adjusted position.

4. A device of the character described comprising a plow share, a series of studs thereon, a mold board, a landside disposed in divergent relation to the mold board, a frog carried by said mold board and having therein notches to receive said studs, said frog having a landside arranged in angular relation thereto and disposed contiguous to the mold-board landside, a bracing bar connected at its extremities to said frog landside and mold board, a segmental rack having one end secured to said bracing bar and the opposite end thereof to said mold board, a finger supporting member movably mounted upon said mold board, fingers carried by said member to engage said studs, and a handle operatively connected with said member, and coacting with said segmental rack to adjust and retain said member in adjusted position.

5. A device of the character described comprising a mold board, a frog on the latter, said frog projecting beyond the lower edge of said mold board, the projecting portion thereof having therein notches, a plow share, having its upper edge in contact with the lower edge of said mold board, and overlying the projecting portion of said frog, studs to project within said notches in the latter, a finger supporting member movably mounted upon the mold board, fingers carried by said member to engage said studs and means coöperating with said member to adjust the latter and retain the same in adjusted position.

6. A device of the character described comprising a mold board, a land side arranged in divergent relation to said mold board, one edge of the land side coacting with one edge of the mold board to form a seat, a plow share, the latter having a landside arranged in angular relation thereto formed with an extension to enter said seat, and coacting means on said share and mold board to retain the latter in detachable engagement with said mold board.

7. A device of the character described comprising a plow share, a series of studs thereon, a mold board, a frog on the latter having therein notches to receive said studs, a finger supporting member, movably mounted upon said mold board, fingers carried by said member to engage said studs, a guide for said finger supporting member, a spring pressed plate mounted upon said guide to yieldingly engage said member, and means coöperating with said member to actuate the latter and retain the same in adjusted position.

8. A device of the character described comprising a mold board, a frog carried by said mold board, a plow share having a detachable engagement with said frog, a member movably mounted upon the latter and coacting with said plow share, a segmental rack secured to said mold board, an actuating lever pivotally connected thereto, one end of said lever having a loose connection with said member, the other end being free, a spring pressed pawl carried by said lever and adapted to engage the teeth of said rack, said pawl having its upper end extended substantially at right angles thereto, a handle having a socket to receive the free end of said lever, a dog pivotally secured to said handle to engage the angular extension of said pawl and means on said handle to actuate the dog thereon.

9. A device of the character described, comprising a plow share, a series of studs thereon, a mold board, a landside arranged in divergent relation thereto, a frog interposed between said landside and mold board, said frog having its lower edge projecting below that of said mold board and having therein a pair of spaced slots extending inwardly in parallel relation from its lower projecting edge, said slots being adapted to receive the studs carried by said plow share, a finger supporting member movably mounted upon said mold board, fingers thereon to engage said studs, and means coöperating with said member to actuate the latter and retain the same in adjusted position.

10. A device of the character described, comprising a mold board, a landside disposed in angular relation with respect thereto, a frog, a landside integrally formed with the latter, said frog landside being interposed between said mold board and its landside with their lower forward portions projecting beyond the forward portions of the mold board and its landside, a plow share, the latter having a divergent landside whose inner surface is formed with a channel, said plow and its landside overlying the projecting extensions of said frog and landside, means on said frog landside to coöperate with said channel and coacting means on said share and mold board to retain the former in detachable engagement with the latter.

WILLIAM KLUG.

Witnesses:
 MIKE FLATLA,
 E. E. HUBER.